(12) United States Patent
Sang

(10) Patent No.: US 8,302,031 B1
(45) Date of Patent: Oct. 30, 2012

(54) SYSTEMS AND METHODS FOR CONFIGURING INFORMATION DISPLAYED ON A SCREEN

(75) Inventor: Xiaolu Sang, Rowland Heights, CA (US)

(73) Assignee: Symantec Corporation, Mountain View, CA (US)

( * ) Notice: Subject to any disclaimer, the term of this patent is extended or adjusted under 35 U.S.C. 154(b) by 296 days.

(21) Appl. No.: 12/760,098

(22) Filed: Apr. 14, 2010

(51) Int. Cl.
*G06F 3/048* (2006.01)

(52) U.S. Cl. ........ 715/848; 715/782; 715/849; 715/850; 715/851; 715/852

(58) Field of Classification Search .................. 715/735, 715/744, 782, 849–852
See application file for complete search history.

(56) References Cited

U.S. PATENT DOCUMENTS

| | | | |
|---|---|---|---|
| 6,243,089 B1 * | 6/2001 | Gong | 715/744 |
| 2005/0289482 A1 * | 12/2005 | Anthony et al. | 715/851 |
| 2007/0055757 A1 * | 3/2007 | Mairs et al. | 709/223 |
| 2009/0172532 A1 * | 7/2009 | Chaudhri | 715/702 |

OTHER PUBLICATIONS

Webpage located at http://en.wikipedia.org/wiki/TouchFLO_3D, last modified Mar. 13, 2010, 4 pages.
Webpage located at http://nooface.net/3dui.shtml, date unknown, 3 pages.
Webpage located at www.htc.com/www/product/touchdiamond/touchflo-3d.html, date unknown, 1 page.
Webpage located at http://blogs.technet.com/tabletpc/archive/2007/02/19/using-flicks-to-switch-windows-via-alt-tab-or-win-tab.aspx, Feb. 19, 2007, 3 pages.
Website: http://en.wikipedia.org/wiki/TouchFLO_3D, *TouchFLO 3D*, Apr. 14, 2010 (4 pgs.).
Website: http://nooface.net/3dui.shtml, *Nooface: In Search of the Post-PC Interface*, Apr. 14, 2010 (3 pgs.).
Website: http://htc.com/www/product/touchdiamond/touchflo-3d.html, *HTC Touch Diamond*, Apr. 14, 2010 (1 pg.).
Website: http://blogs.technet.com/tabletpc/archive/2007/02/19/using-flicks-to-switch-windows-via-alt-tab-or-win-tab.aspx, *Tablet PC Team Blog*, Apr. 14, 2010 (3 pgs.).

* cited by examiner

*Primary Examiner* — Nicholas Augustine
*Assistant Examiner* — Claudia Dragoescu
(74) *Attorney, Agent, or Firm* — Holland & Hart LLP

(57) ABSTRACT

A computer-implemented method for configuring information displayed on a screen is described. A display model is generated on the screen. The display model includes a status page and at least one configuration page. The pages of the display model are organized in a three-dimensional format on the screen. A header and a status icon are displayed on the at least one configuration page. At least one configuration page is filtered to prevent the at least one configuration page from being displayed on the screen.

20 Claims, 9 Drawing Sheets

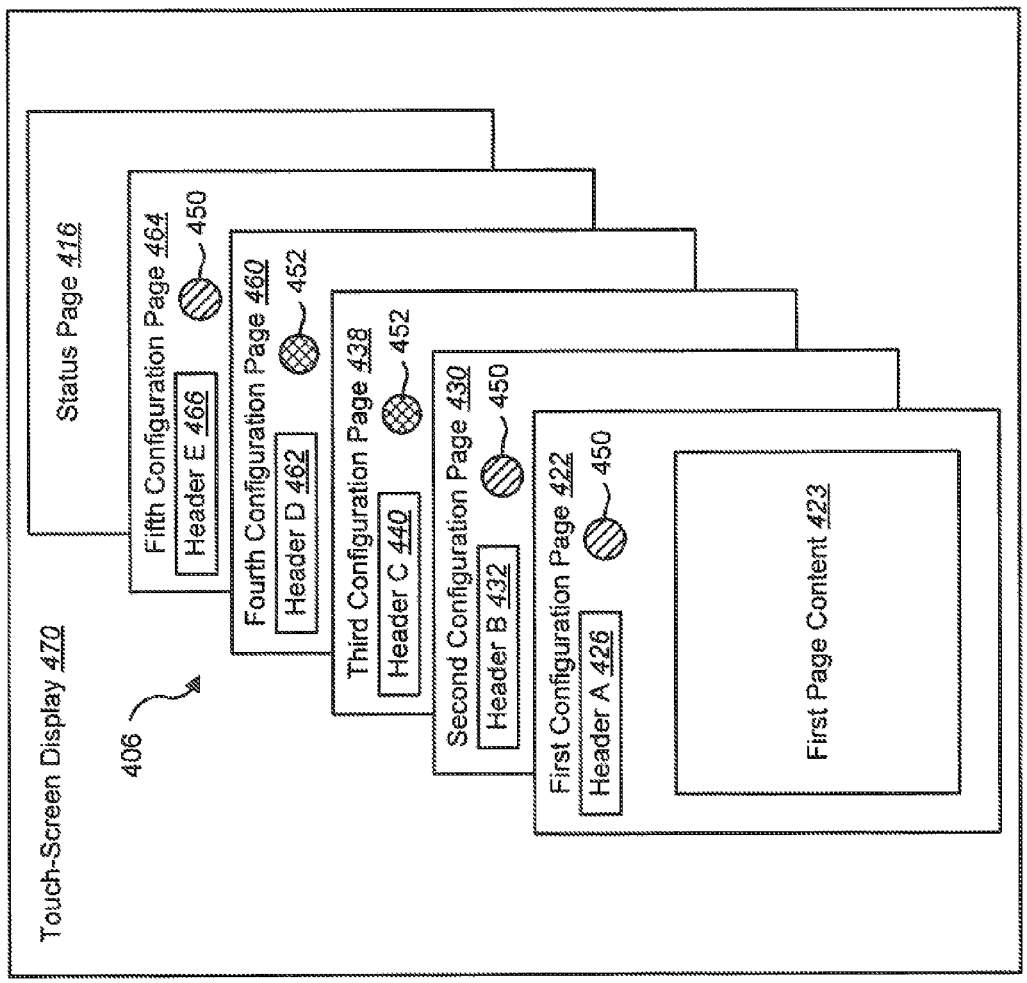

SYSTEMS AND METHODS FOR CONFIGURING INFORMATION DISPLAYED ON A SCREEN

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone that uses and relies on computers.

Information may be displayed to a user via a display screen on a computing system. The display screens may vary in size and resolution from one computing device to another. Users continue to demand improvements as to the way the information is displayed on the screen. As a result, benefits may be realized by providing improved systems and methods for configuring information displayed on a screen of a computing device.

SUMMARY

According to at least one embodiment, a computer-implemented method for configuring information displayed on a screen is described. A display model is generated on the screen. The display model includes a status page and at least one configuration page. The pages of the display model are organized in a three-dimensional format on the screen. A header and a status icon are displayed on the at least one configuration page. At least one configuration page is filtered to prevent the at least one configuration page from being displayed on the screen.

In one embodiment, the screen is a touch-screen display. At least one page of the display model may be rotated through in accordance with a swiping motion by a user on the surface of the screen. The number of pages to display on the screen may be determined based on the size of the screen. In addition, the number of pages to display on the screen may be determined based on the resolution of the screen.

In one example, at least one configuration page may be prevented from being displayed based on a filter. At least one status icons and an associated number of configuration pages associated with each status icon may be displayed on the status page. In addition, at least one filter icon associated with at least one status icon may be displayed on the status page. In one embodiment, the header may be a title associated with a configuration page.

A computer system configured to organize information displayed on a screen may be described. The computer system may include a processor and memory in electronic communication with the processor. The computer system may also include a navigation tool. The tool may be configured to generate a display model on the screen. The display model may include a status page and at least one configuration page. The tool may also be configured to organize the pages of the display model in a three-dimensional format on the screen, and display a header and a status icon on the at least one configuration page. The tool may further configured to filter the at least one configuration page to prevent the at least one configuration page from being displayed on the screen.

A computer-program product for configuring information displayed on a screen is also described. The computer-program product may include a computer-readable medium having instructions thereon. The instructions may include code programmed to generate a display model on the screen. The display model may include a status page and at least one configuration page. The instructions may also include code programmed to organize the pages of the display model in a three-dimensional format on the screen, and code programmed to display a header and a status icon on the at least one configuration page. The instructions may further include code programmed to filter the at least one configuration page to prevent the at least one configuration page from being displayed on the screen.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4A is a block diagram illustrating another example of the display model;

Figure 1:
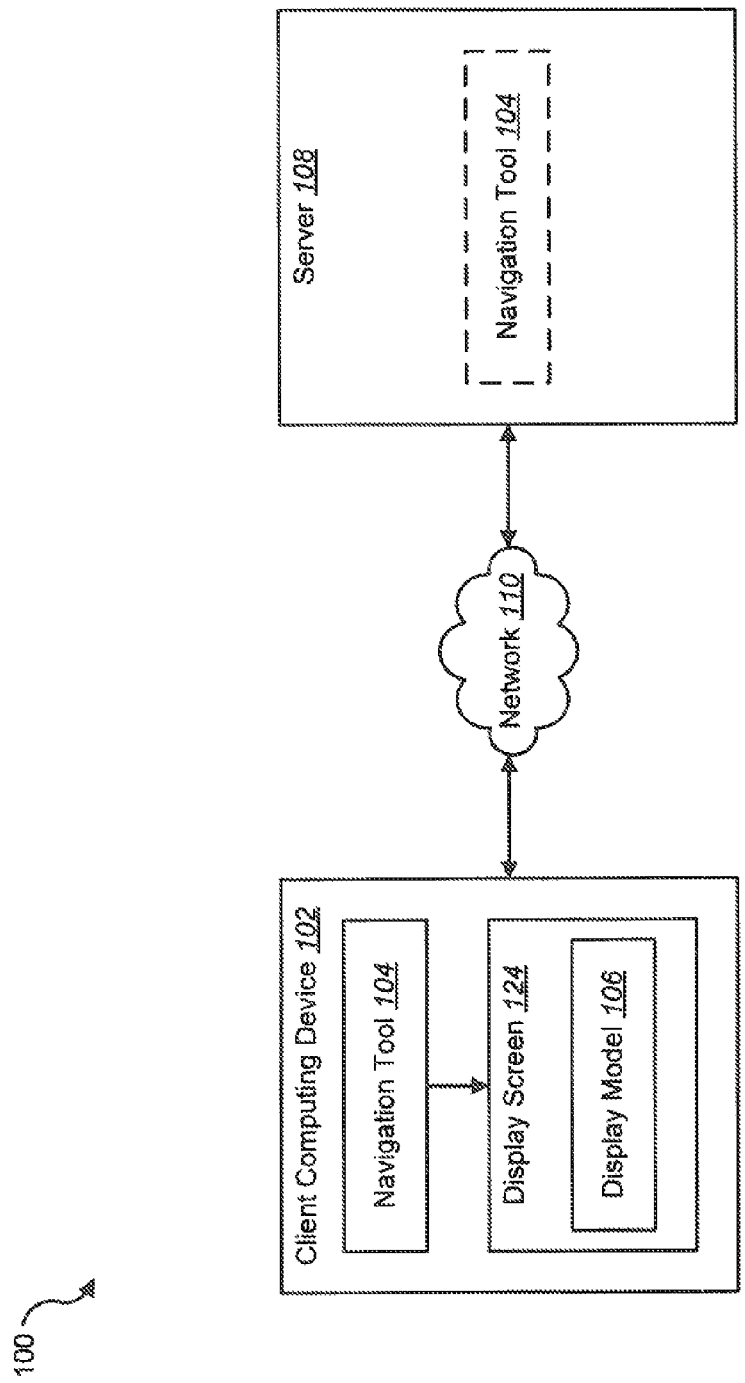
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Many computing devices include a touch-screen. A touch-screen is an electronic visual display that may detect the presence and location of a touch within a display area. The touch may be done by contacting the surface of the display area with a finger, hand, pen, or any other suitable object or instrument. A touch-screen enables a user to interact with the displayed content directly on the screen, where the content is displayed, rather than indirectly with a mouse or touchpad. In addition, a touch-screen allows the user to directly interact with the displayed content without requiring an intermediate device, such as a stylus, that is held in the hands of the user. Computing devices such as personal digital assistants (PDAs), cameras, satellite navigation devices, mobile communication devices, video game consoles, laptops, tablet personal computers (tablet-PCs), and many other types of devices that may include a touch-screen.

Content that is displayed on a touch-screen may be referred to as a display model or a navigation model. A display model may be a particular product, program, etc. running on the computing device. The model may have a main page and several sub-pages. A user may access the information on the main page or one of the sub-pages of the display model.

Currently, display models displayed on touch-screens have several limitations. The size of the display area (i.e., the screen real estate) may limit the amount of information being displayed. As a result, a limited number of pages of the display model may be displayed to the user. In order to navigate to a particular page, a user typically uses a tapping motion with a finger on the touch-screen. The tapping motion may result in a current page ceasing to be displayed and a subsequent page of the model being displayed to the user. In addition to a tapping motion, the user may perform a "flicking" or "swiping" motion across the touch-screen to navigate from one page to another page. This type of linear navigation may make it difficult for users to make multiple changes on different sub-pages quickly.

Further, current display models do not provide a complete overview of the status of each page included in the display model. Also, current display models do not provide the ability to filter certain sub-pages of the display model based on the current status of the sub-pages. The present systems and methods may use the "depth" on a display screen with limited real estate in order to create a three-dimensional information display model. Further, the present systems and methods may provide an overview of each page within the model as well as the ability to filter one or more pages based on a status of the pages.

FIG. 1 is a block diagram illustrating one embodiment of an environment 100 in which the present systems and methods may be implemented. In one embodiment, a client computing device 102 may include a navigation tool 104 that may implement the present systems and methods. In another embodiment, the navigation tool 104 may be installed on a server 108. The client computing device 102 may communicate with the server 108 across a network connection 110.

The client computing device 102 may further include a display screen 124. The display screen 124 may be a touch-screen and may provide a display model 106 to a user. In one configuration, the display model 106, as well as the layout and configuration of the display model 106 on the display screen 124, may be generated and organized by the navigation tool 104. The computing device 102 may be a PDA, a camera, a satellite navigation device, a mobile communication device, a video game console, a laptop, a tablet-PC, or any other device that may include a touch-screen. Details regarding the navigation tool 104 and the display model 106 generated by the navigation tool 104 will be described below.

Figure 2:
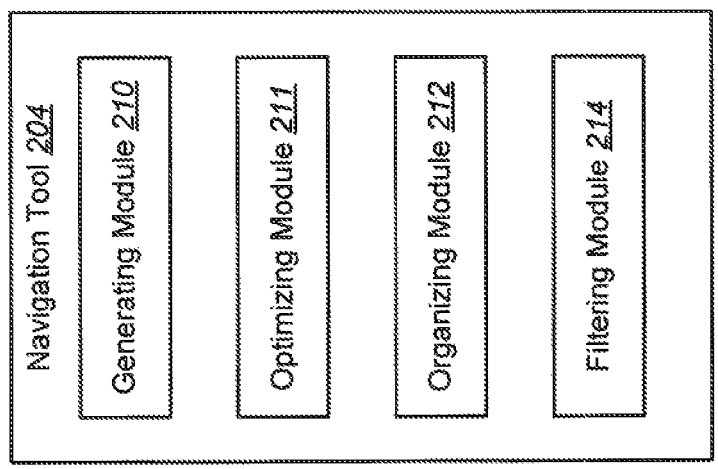
FIG. 2 is a block diagram illustrating a further embodiment of a navigation tool.

FIG. 2 is a block diagram illustrating a further embodiment of a navigation tool 204. In one configuration, the navigation tool 204 may include a generating module 210, an optimizing module 211, an organizing module 212, and a filtering module 214.

In one example, the generating module 210 may generate the display model 106. The generating module 210 may generate or create a three-dimensional information display model that may be displayed to a user on a touch-screen display. The optimizing module 211 may optimize certain features of the display model 106. For example, the optimizing module 211 may determine the number of pages to display in the three-dimensional display model 106. The optimizing module 211 may determine the number of pages to display based on characteristics of the touch-screen display. For example, the resolution and size of the screen may be characteristics analyzed by the optimizing module 211 when determining the number of pages of the display model 106 to display on the touch-screen.

In one embodiment, the organizing module 212 may organize the pages of the display model 106. The organizing module 212 may sort, align, and collage the pages in a certain order that will be displayed to the user. For example, the organizing module 212 may organize the pages of the display model 106 in a stack that may resemble a three-dimensional stack of the pages on the touch-screen. In one configuration, the filtering module 214 may filter the types of pages of the display model 106 that are displayed to the user. For example, the filtering module 214 may skip (i.e., not display) certain pages of the display module 206 to the user. As an example, the filtering module 214 may be an icon or other feature that may interface with the user. The user may select the filtering module 214 in order to select the types of pages that are displayed on the display module 206. The pages that are not selected may be skipped and not displayed to the user.

Figure 3:
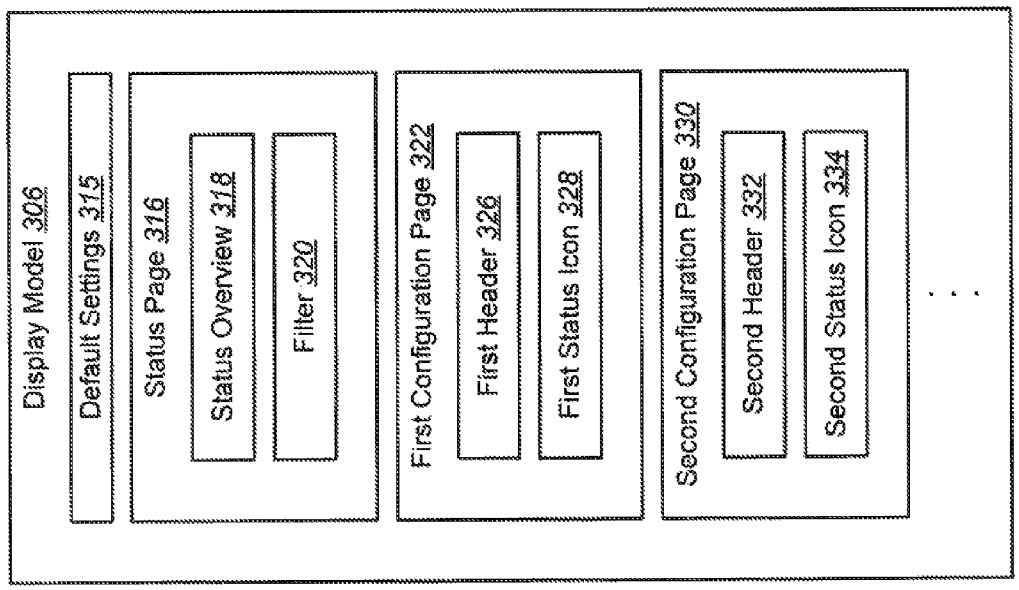
FIG. 3 is a block diagram illustrating a further embodiment of a display model.

FIG. 3 is a block diagram illustrating a further embodiment of a display model 306. In one embodiment the display model 306 may be displayed on a screen to a user, such as a touch-screen. In one example, the touch-screen may allow the user to interact with the display model 306. For example, the user may implement a "flicking" or "swiping" motion to cycle through various pages of the display module 306.

In one configuration, the display model 306 may include a status page 316. The display 306 may also include a first configuration page 322 and a second configuration page 330. While only the first configuration page 322 and the second configuration page 330 are illustrated, it is to be understood that the display model 306 may include more or less than the first configuration page 322 and the second configuration page 330.

In one example, the status page 316 may include a status overview 318 and a filter 320. The status overview 318 may provide an overview of the status of each configuration page 322, 330 that may be included in the display model 306. The status of a configuration page may indicate, for example, whether the page has successfully loaded, whether a certain setting on the page has been configured, whether the page is accessible, and the like. The status overview 318 may provide overview information to a user regarding each configuration page included in the display model 306 so that the user may easily determine the current status of each configuration page of the display model 306. In one embodiment, the filter 320 may allow the user to select the types of configuration pages are to be displayed. For example, while the user "flicks" or "swipes" through the pages of the display model 106, the filter 320 may cause certain pages to be skipped. As a result, the skipped pages may not be displayed to the user.

In one embodiment, the first configuration page 322 may include a first header 326 and a first status icon 328. The first header 326 may include a title or other information that identifies the first configuration page 322. The first status icon 328 may provide an indicator to the user as to the status of the first configuration page 322.

In one configuration, the second configuration page 330 may include a second header 332 and a second status icon 334. The second header 332 and the second status 334 may be similar in purpose to the first header 326 and the first status icon 328 previously described.

In one embodiment, the display model 306 may include default settings 315. The default settings 315 may indicate a default configuration of the display model 306. For example, the default settings 315 may indicate a default number of configuration pages of the display model 306 to display on the touch-screen. The default settings 315 may also include a default configuration of information that is displayed for each configuration page of the display model 306. In one example, a user may customize the settings of the display model 306. For example, the user may configured the setting in order to increase or decrease the number of configuration pages of the display model 306 that are displayed on the touch-screen. In addition, the user may customize the settings to increase, decrease, and/or change the information displayed on the status page 316 and/or a configuration page.

Figure 4:
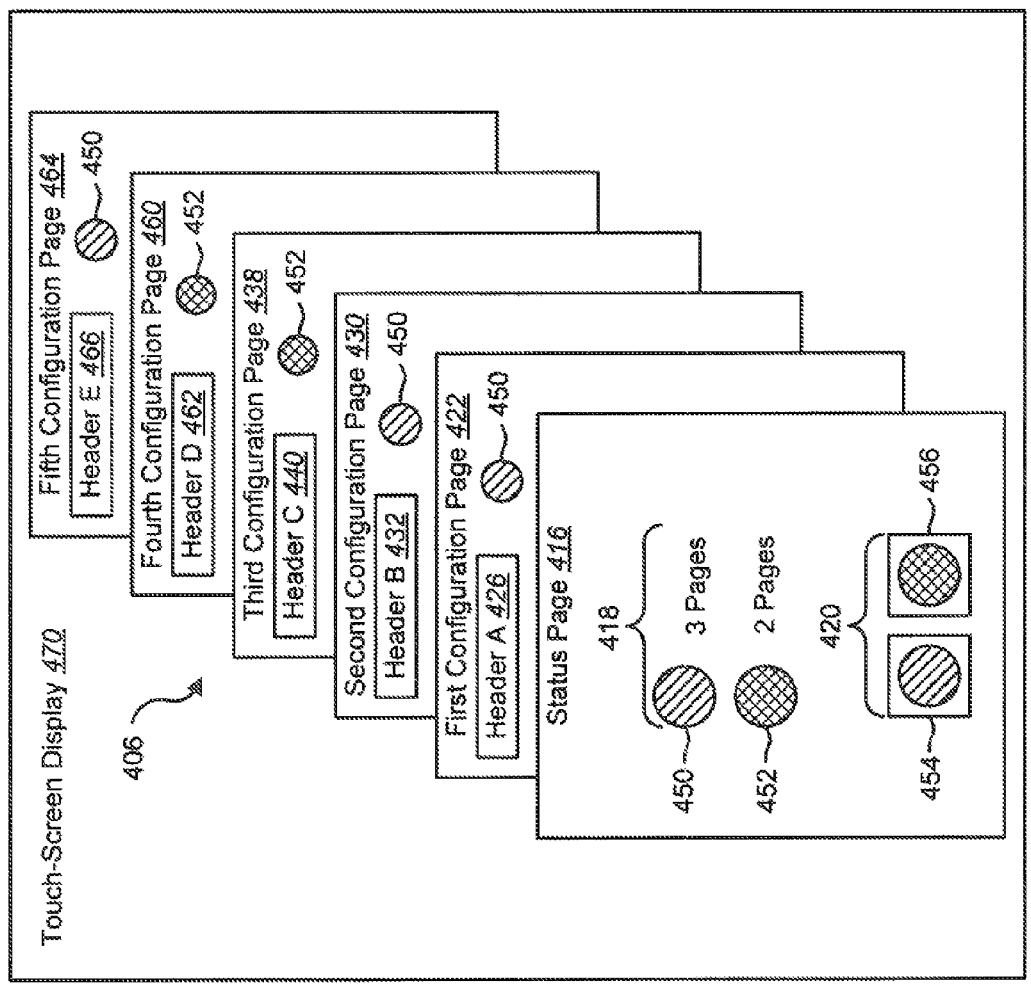
FIG. 4 is a block diagram illustrating one example of a display model that may be displayed on a screen such as a touch screen.

FIG. 4 is a block diagram illustrating one example of a display model 406 that may be displayed on a touch-screen display 470. In another embodiment, the display model 406 may be displayed on a screen that does not include touch-screen characteristics or capabilities.

In one example, the display model 406 may include a status page 416. The model 406 may also include one or more configuration pages 422, 430, 438, 460, 464. The status page 416 may provide a general overview of the configuration pages included in the display model 406.

In one embodiment, the status page 416 may include a status overview 418. The status overview 418 may include one or more status icons 450, 452 and an indication as to the number of configuration pages that are associated with each status icon 450, 452. The status icons 450, 452 may indicate the status of the configuration pages of the display model 406. As an example, the status overview 418 may indicate that three configuration pages are associated with a first status icon 450 and two configuration pages are associated with a second status icon 452.

The status page 416 may also include a filter 420. The filter 420 may include a first filter icon 454 and a second filter icon 456. The first filter icon 454 may be associated with the first status icon 450. The second filter icon 456 may be associated with the second status icon 452. In one example, the user may select one of the filter icons 454, 456. When the user interacts with the display model 406 and performs a "flicking" or "swiping" motion on the touch-screen display 470, the configuration pages may be rotated or cycled through so that the entire contents of a configuration page is displayed to the user. When the desired configuration page is presented to the user, the user may stop the "flicking" or "swiping" motion. If the user has selected a filter icon 454, 456, configuration pages associated with the status icon that is included as part of the selected filter icon may be displayed to the user as the pages are rotated or cycled through. Configuration pages that are not associated with the status icon that is included as part of the selected filter icon may be skipped (i.e., these pages may not be displayed to the user).

In one example, the display model 406 may be presented or displayed in a three-dimensional format on the touch-screen display 470. One or more configuration pages 422, 430, 438, 460, 464 may include a header and a status icon. For example, a first configuration page 422 may include header A 426. Header A 426 may indicate the title or other identifying information for the first configuration page 422. The first configuration page 422 may also include the first status icon 450. The additional configuration pages in the display model 406 may also include a header and a status icon.

As previously explained, the user may rotate or cycle through the configuration pages of the display model 406 by causing or implementing a "flicking" or "swiping" motion. For example, the user may implement a "swipe" by touching the touch-screen display 470 with a finger, hand, stylus, or other medium and performing a swiping motion across a portion of the touch-screen display 470. As the user swipes across the display 470, the status page 416 may collapse, disappear, etc. and the user may view the contents of the first configuration page 422. The user may then continue the swiping motion and the first configuration page 422 may collapse, disappear, etc. and the user may view the contents of the second configuration page 430. The user may stop the swiping motion when the desired configuration page is display on the screen 470. The user may continue the swiping motion until the display model 406 has cycled back to display the status page 416 as illustrated in FIG. 4.

FIG. 4A is a block diagram illustrating one example of the display model 406 after a user has performed a swiping motion across a portion of the touch-screen display 470. The display model 406 illustrated in FIG. 4A is merely an example and it is to be understood that the format of the display model 406 may vary as the user swipes a portion of the touch-screen display 470. As illustrated, after the user swipes across the screen 470, the first configuration page 422 may not be fully displayed to the user and the use may view first page contents 423 included on the first configuration page 422.

Figure 4B:
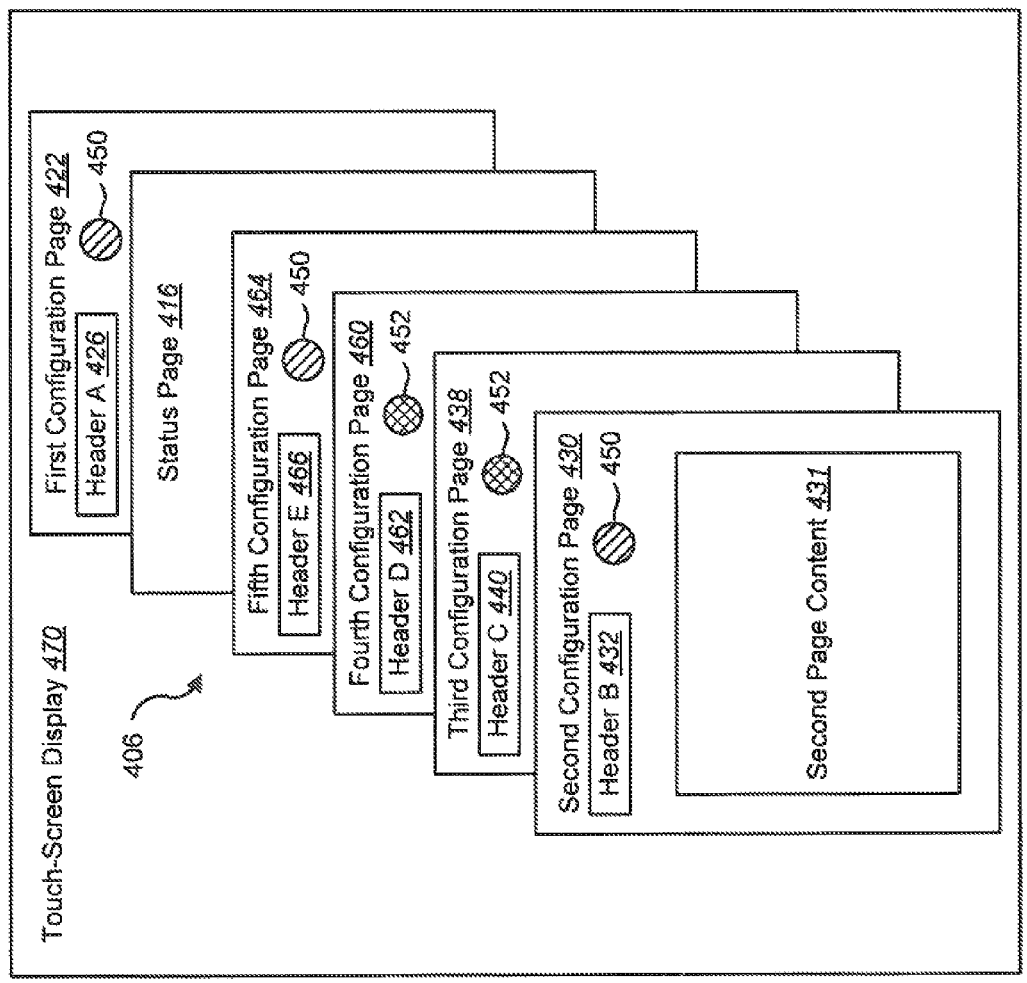
FIG. 4B is a block diagram illustrating another example of the display model.

In one embodiment, the user may swipe again across the screen 470 and the pages of the display model 406 may be rotated as illustrated in FIG. 4B. As a result, the user may view second page content 431 included on the second configuration page 430. The user may continue swiping to view other pages in the display model 406 until the desired page is displayed.

If the user selects a filter 420, the configuration pages that are associated with the selected status icon may be displayed to the user while configuration pages that include the non-selected status icon may be skipped. For example, if the user selects the second filter icon 456 (associated with the second status icon 452), the pages that include the second status icon 452 may be displayed to the user while pages including the first status icon 452 may be skipped. As a result, when the user performs a first swiping motion on the screen 470 illustrated in FIG. 4, the first configuration page 422 and the second configuration page 430 may be skipped and the first page to be displayed to the user may be the third configuration page 438. In this example, the first and second configuration pages 422, 430 are associated with the first status icon 450 (which has been filtered out). The third configuration page 438, in this example, is the first page to be displayed to the user because the third configuration page 438 includes the second status icon 452. If the user deselects the second filter icon 456, the configuration pages that include the first status icon 450 may not be skipped when the user perform subsequent swipes across the screen 470.

In this example, the touch-screen display 470 may provide multiple configuration pages 422, 430, 438, 460, 464 to be displayed to the user in a three-dimensional format. The status page 416 may provide a quick overview to the user regarding each configuration page in the display model 406. In addition, the header information and status icon for each configuration page may also be displayed to the user before the user begins to cycle through the configuration pages. Further, the filter 420 may allow the user to quickly find a desired or appropriate configuration page that is associated with a particular status icon.

Figure 5:
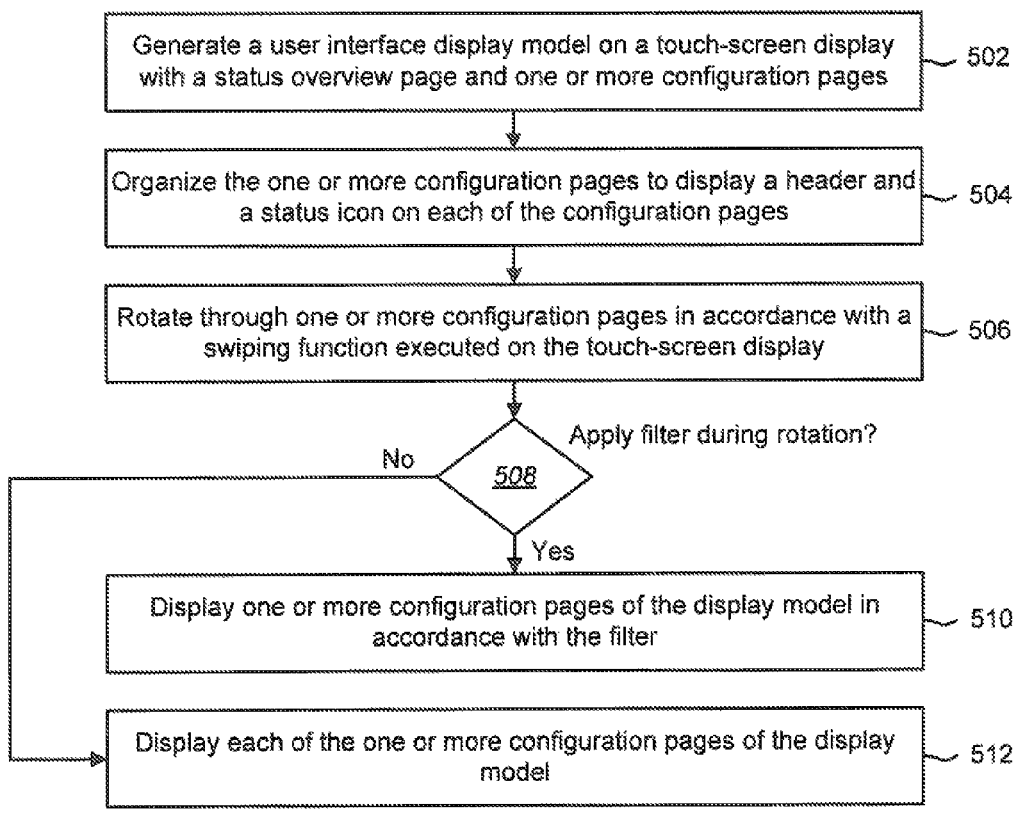
FIG. 5 is a flow diagram illustrating one embodiment of a method for generating a display model for a touch screen.

FIG. 5 is a flow diagram illustrating one embodiment of a method 500 for generating a display model 106 to be displayed on a touch screen. In one embodiment, the method 500 may be implemented by the navigation tool 104 on a touch-screen display.

In one configuration, a user interface display model 106 may be generated 502 on a touch-screen display. The display model 106 may include a status overview page 316 and one or more configuration pages 322, 330. In one embodiment, the one or more configuration pages 322,330 may be organized 504 to display a header and a status icon on each of the configuration pages. In addition, the one or more configuration pages may be organized 504 in a three-dimensional format. In one embodiment, one or more configuration pages may be rotated through 506 in accordance with a swiping function executed on the surface of the touch-screen display.

A determination 508 may be made as to whether to apply a filter during the rotation of the one or more configuration pages. If it is determined 508 that a filter is to be applied, one or more configuration pages of the display model may be displayed 510 in accordance with the filter during the rotation of the pages. If, however, it is determined 508 that a filter is not to be applied, each of the one or more configuration pages of the display model may be displayed 512 during the rotation of the pages.

Figure 6:
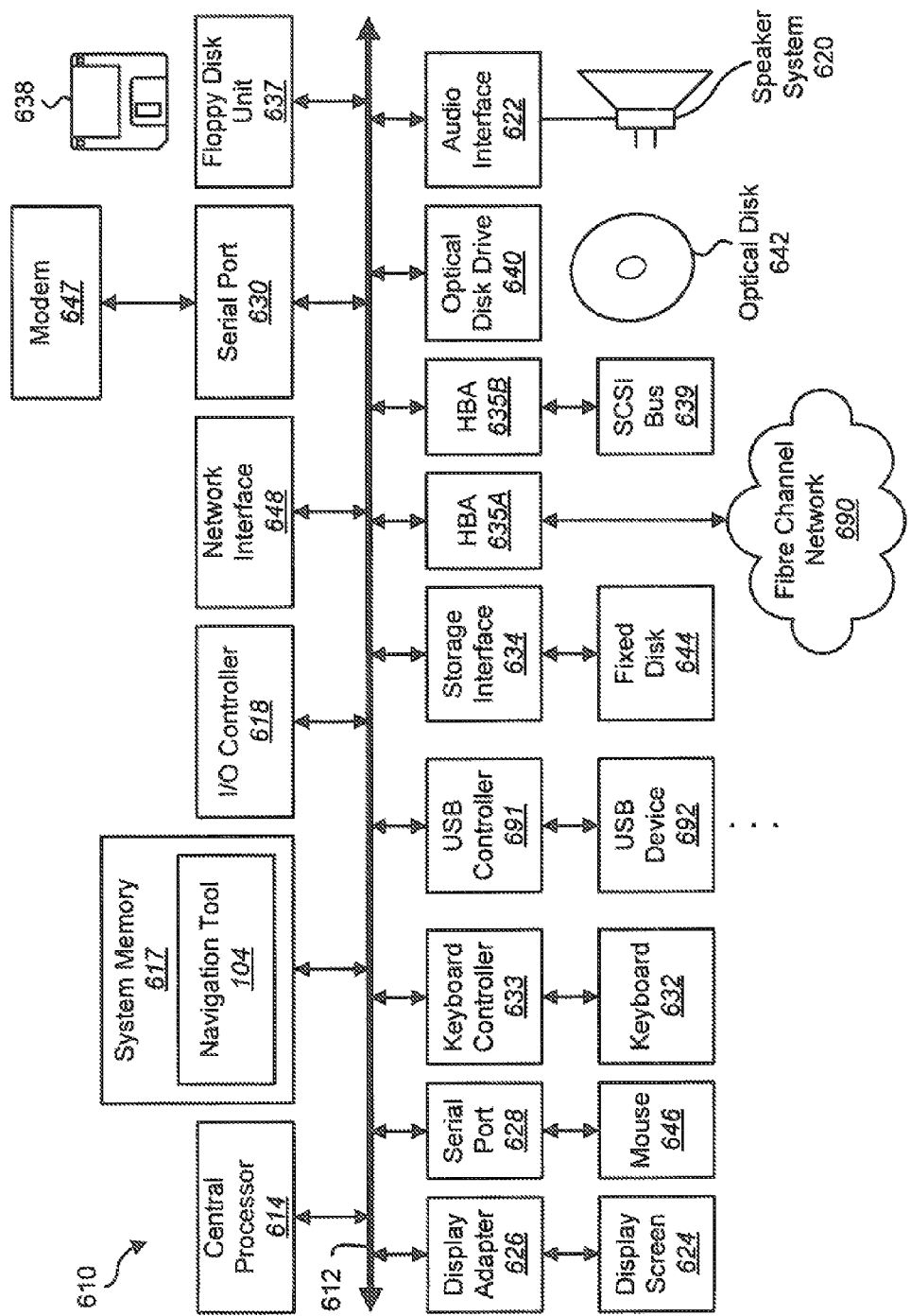
FIG. 6 depicts a block diagram of a computer system suitable for implementing the present systems and methods.

FIG. 6 depicts a block diagram of a computer system 610 suitable for implementing the present systems and methods. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), multiple USB devices 692 (interfaced with a USB controller 690), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the navigation tool 104 to implement the present systems and methods may be stored within the system memory 617. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present systems and methods. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable medium such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
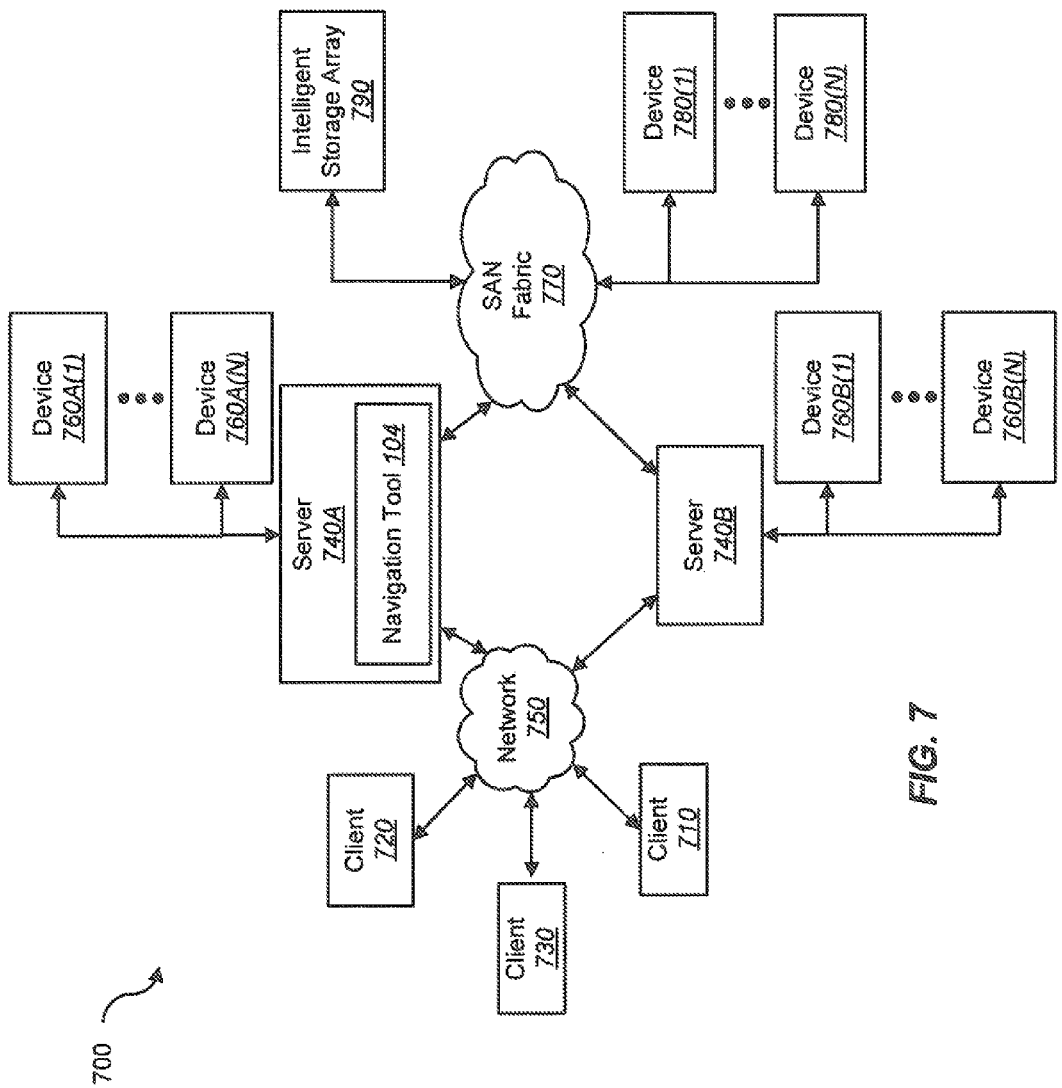
FIG. 7 is a block diagram depicting a network architecture in which client systems, as well as storage servers (any of which can be implemented using computer system), are coupled to a network.

FIG. 7 is a block diagram depicting a network architecture 700 in which client systems 710, 720 and 730, as well as storage servers 740A and 740B (any of which can be implemented using computer system 610), are coupled to a network

750. In one embodiment, the navigation tool 104 may be located within a server 740A, 740B to implement the present systems and methods. The storage server 740A is further depicted as having storage devices 760A(1)-(N) directly attached, and storage server 740B is depicted with storage devices 760B(1)-(N) directly attached. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720, and 730 to network 750. Client systems 710, 720, and 730 are able to access information on storage server 740A or 740B using, for example, a web browser or other client software (not shown). Such a client allows client systems 710, 720, and 730 to access data hosted by storage server 740A or 740B or one of storage devices 760A(1)-(N), 760B(1)-(N), 780(1)-(N) or intelligent storage array 790. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for configuring information displayed on a screen, comprising:
   generating a display model on the screen, wherein the display model comprises a status page and at least one configuration page, the status page initially being displayed in a forefront position on the screen and comprising one or more filtering options;
   organizing the pages of the display model in a three-dimensional format on the screen;
   displaying a header and a status icon on the at least one configuration page;
   receiving input relating to a selection of the one or more filtering options;
   in response to receiving the input, performing a scroll operation, the operation comprising:
   displaying a filtered configuration page; and
   bypassing the display of an intervening unfiltered configuration page.

2. The method of claim 1, wherein the screen is a touchscreen display.

3. The method of claim 1, further comprising rotating through at least one page of the display model in accordance with a swiping motion by a user on the surface of the screen.

4. The method of claim 1, further comprising determining the number of pages to display on the screen based on the size of the screen.

5. The method of claim 1, further comprising determining the number of pages to display on the screen based on the resolution of the screen.

6. The method of claim 1, further comprising preventing the at least one configuration page from being displayed based on a filter.

7. The method of claim 1, further comprising displaying at least one status icon and an associated number of configuration pages associated with each status icon on the status page.

8. The method of claim 1, further comprising displaying at least one filter icon associated with at least one status icon on the status page.

9. The method of claim 1, wherein the header comprises a title associated with a configuration page.

10. A computer system configured to organize information displayed on a screen, comprising:
    a processor;
    memory in electronic communication with the processor;
    instructions stored in the memory, the instructions being executable by the processor to:
      generate a display model on the screen, wherein the display model comprises a status page and at least one configuration page the status page initially being displayed in a forefront position on the screen and comprising one or more filtering options;
      organize the pages of the display model in a three-dimensional format on the screen;
      display a header and a status icon on the at least one configuration page;

receive input relating to a selection of the one or more filtering options; and in response to receiving the input, perform a scroll operation to display a filtered configuration page, and bypass the display of an intervening unfiltered configuration page.

11. The computer system of claim 10, wherein the screen is a touch-screen display.

12. The computer system of claim 10, wherein the processor is further configured to rotate through at least one page of the display model in accordance with a swiping motion by a user on the surface of the screen.

13. The computer system of claim 10, wherein the processor is further configured to determine the number of pages to display on the screen based on the size of the screen.

14. The computer system of claim 10, wherein the processor is further configured to determine the number of pages to display on the screen based on the resolution of the screen.

15. The computer system of claim 10, wherein the processor is further configured to prevent at least one configuration page from being displayed based on a filter.

16. The computer system of claim 10, wherein the processor is further configured to display at least one status icon and an associated number of configuration pages associated with each status icon on the status page.

17. The computer system of claim 10, wherein the processor is further configured to display at least one filter icon associated with at least one status icon on the status page.

18. The computer system of claim 10, wherein the header comprises a title associated with a configuration page.

19. A computer-program product for configuring information displayed on a screen, the computer-program product comprising a non-transitory computer-readable medium having instructions thereon, the instructions being executable by a processor to:

generate a display model on the screen, wherein the display model comprises a status page and at least one configuration page, the status page initially being displayed in a forefront position on the screen and comprising one or more filtering options;

organize the pages of the display model in a three-dimensional format on the screen;

display a header and a status icon on the at least one configuration page;

receive input relating to a selection of the one or more filtering options; and in response to receiving the input, perform a scroll operation to display a filtered configuration page, and bypass the display of an intervening unfiltered configuration page.

20. The computer-program of claim 19, wherein the screen is a touch-screen display.

* * * * *